US007535401B2

(12) United States Patent
Tolmei

(10) Patent No.: US 7,535,401 B2
(45) Date of Patent: May 19, 2009

(54) ACTIVATION OF REMOTE CONTROL TRANSMITTER FUNCTIONS BY EXTERNAL INPUTS

(76) Inventor: Ron Tolmei, 1399 Ygnacio Valley Rd., Suite 32, Walnut Creek, CA (US) 94598

( * ) Notice: Subject to any disclaimer, the term of this patent is extended or adjusted under 35 U.S.C. 154(b) by 312 days.

(21) Appl. No.: 11/189,470

(22) Filed: Jul. 25, 2005

(65) Prior Publication Data

US 2007/0018878 A1 Jan. 25, 2007

(51) Int. Cl.
*H04L 17/02* (2006.01)

(52) U.S. Cl. ............. 341/176; 340/825.69; 340/825.72; 340/825.19; 341/20

(58) Field of Classification Search ................. 341/176; 340/825.69, 825.19; 348/734
See application file for complete search history.

(56) References Cited

U.S. PATENT DOCUMENTS 5,272,477 A * 12/1993 Tashima et al. ........ 340/870.16
5,684,460 A * 11/1997 Scanlon ................... 340/573.1
6,011,477 A * 1/2000 Teodorescu et al. ....... 340/573.1
6,280,392 B1 * 8/2001 Yoshimi et al. ............. 600/534
6,297,738 B1 * 10/2001 Newham ................. 340/573.1
6,346,891 B1 * 2/2002 Feinleib et al. ........ 340/825.69
6,560,466 B1 * 5/2003 Skorko ....................... 455/567
6,980,150 B2 * 12/2005 Conway et al. ............. 341/176
2006/0103209 A1 * 5/2006 Olcheski ..................... 297/330

* cited by examiner

*Primary Examiner*—Timothy Edwards, Jr.
(74) *Attorney, Agent, or Firm*—D. Benjamin Borson; Borson Law Group, PC

(57) ABSTRACT

The ability to operate remote control transmitter functions from external sensors, in conjunction with internal or external controls, to provide condition dependant automatic control of devices such as digital video recorders and the like are presented. The system enables any remote control transmitter to be modified to perform this function without the need to redesign any existing control functions either in the transmitter or receiver and is compatible with all remote control transmitters and receiver functions. The system is applicable to any form of control, is not dependant on existing designs, and easily implemented in any remote control transmitter. The system is a cost-effective solution to any problem, or requirement, associated with external control of remote control functions.

11 Claims, 3 Drawing Sheets

ACTIVATION OF REMOTE CONTROL TRANSMITTER FUNCTIONS BY EXTERNAL INPUTS

CROSS-REFERENCE TO RELATED APPLICATIONS

References Cited

U.S. Patent Documents

| | | | |
|---|---|---|---|
| 6,771,885 | Aug. 3, 2004 | Agnihorti, et al. | 386/83. |
| 6,757,906 | Jun. 29, 2004 | Look, et al. | 725/45 |
| 6,236,395 | May 22, 2001 | Sezan, et al. | 715/723 |
| 6,694,515 | Feb. 17, 2004 | DeBot, et al. | 725/105 |
| 6,748,462 | Jun. 8, 2004 | Dubil, et al. | 710/8 |
| D431,552 | Oct. 3, 2000 | Backs, et al. | D14/218 |
| D433,403 | Nov. 7, 2000 | Backs, et al. | D14/218 |
| D424,061 | May 2, 2000 | Backs, et al. | D14/218 |
| D424,577 | May 9, 2000 | Backs, et al. | D14/218 |

BACKGROUND OF THE INVENTION

1. Field of the Invention

This invention relates to a remote control transmitter, hereafter device, which in addition to the usual manual keypad inputs has external inputs to control operating parameters of a remote control receiver. The device uses a modified commercially available remote control transmitter equipped with external inputs that enable the transmitter to automatically control various operating modes of its companion receiver as a function of external sensors.

2. Discussion of Background

In light of the increased use of remote control technology in everyday use it becomes apparent that often a user has to perform routine and repetitive functions that could be performed without operator intervention. As we have now acquired the technology to economically produce devices to emulate human response it becomes prudent and cost-effective to capitalize on this technology to minimize unnecessary work or labor. When television was first introduced it was incomprehensible to think of any advantage to having remote control of a television set with only a few channels and sitting only 5 feet away. Now with the increase in capabilities and technology, and the interaction between technologies, remote controls have become a necessity . . . not a luxury. Many routine functions required to be performed in our daily activities have now become so laborious, time consuming, routine, and sometimes dangerous that we must resort to remote controlled systems.

For example, it would be difficult if not impossible and often life threatening to thwart forms of terrorism if it were not for remote control manipulators such as bomb removal systems. Further, what about our elderly, handicapped, mentally and physically impaired . . . could they function in our society without the benefit of remote controlled devices? As such it is imperative that we invent and develop the necessary technologies, at the risk of initially being labeled lazy or couch potatoes, to vision the future. Remember, few envisioned the utility of the computer mouse as a remote control device that today supports some of the most famous, and severely handicapped, physicists of our time. Could Stephen Hawking in his efforts to quantify the history of the universe and the big bang theory function without the technology of the mouse? I think not. In every facet of life today, engineering, biology, medicine, and such we rely on remote control devices and could not support advances in science without remote control devices that we use in every day life.

Further there is an immediate need in our society to fight terrorism, kidnapping, molestation, and crime in general with an immediate need to expand surveillance to protect us from these egregious acts. This will invariably require the use of remote control devices previously thought to be children's toys or simply a means to avoid work.

There have been many attempts to provide expanded capabilities to systems by using remote control devices examples of which are shown in the prior art apparatus contained U.S. Pat. No. 6,771,885 issued Aug. 3, 2004. Other types of remote control apparatus are shown in U.S. Pat. No. 6,757,906 issued Jun. 29, 2004, U.S. Pat. No. 6,236,395 issued May 22, 2001, U.S. Pat. No. 6,694,515 issued Feb. 17, 2004, U.S. Pat. No. 6,748,462 issued Jun. 8, 2004, U.S. Pat. No. D431,552 issued Oct. 3, 2000, U.S. Pat. No. D433,403, issued Nov. 7, 2000, U.S. Pat. No. D424,061 issued May 2, 2000 and U.S. Pat. No. D424,577 issued May 9, 2000 which address these issues.

Inherent in the design of all these systems is the lack of external inputs to control receiver functions by sensors or other external inputs. The present invention provides a solution to that problem in a cost-effective manner and can be adapted to any device that has remote control capabilities. Additionally, the redesign of existing remote controls functions is not required as the existing control functions are not compromised or affected—only activated by other devices or sensors.

BRIEF SUMMARY OF THE INVENTION

According to the present invention a means of activating remote control transmitter functions via external inputs is provided. The apparatus uses existing remote control technology, compatible with infrared, visual, acoustical, or radio frequency electromagnetic transmission with an interface to external sensors or devices via Complementary Metal Oxide (CMOS) switches, logic levels or contact closures.

The fundamental operation of the device is to control remote controller functions by external sensors or other devices. These devices can be any device capable of providing a logic level or contact closure. Each remote control is independent of other remote controls and can operate as a stand-alone system not requiring interaction with other remotes with multiple remote controls to transmit commands from different sensors or devices to multiple remote control receivers.

In the preferred embodiment of the invention the modified remote control transmitter is interfaced to the external sensor or controlling device by wiring, optically or jacks on the remote control transmitter. In another embodiment, the entire system is one piece and resembles that of the preceding embodiment except it is a single dedicated module.

Other objects of the present invention will become apparent upon reading the following specification and referring to the accompanying drawings in which similar characters of reference represent corresponding parts in each of the several views.

BRIEF DESCRIPTION OF THE SEVERAL VIEWS OF THE DRAWINGS

The above advantages and subsequent description will be more readily understood by reference to the following drawings.

DETAILED DESCRIPTION OF THE INVENTION

Figure 1:
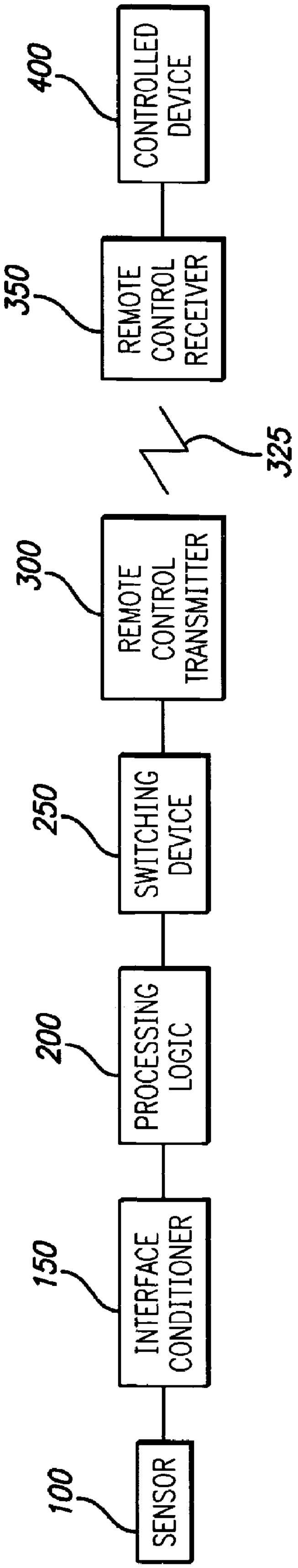
FIG. 1 is a block diagram showing the modified remote control system configuration.

In FIG. 1 sensor 100 coverts the parameter to be sensed, such as occupancy, temperature, light, velocity, position etc, into an analog or digital signal proportional to the magnitude of the action sensed. This signal is then sent to interface conditioner 150 which in turn conditions the signal into a form compatible with processing logic 200. Processing logic 200 then performs the necessary operations to decide and convert the desired outcome into a command signal compatible with switching device 250. Switching device 250 in turn provides a parallel contact closure to remote controller transmitter 300 internal switch, or switches, that in normal operation are manually activated by pressing the intended function on remote control transmitter 300. Transmitter 300 in turn sends a coded communication command signal 325 in the communication medium provided by the remote controller transmitter to remote control receiver 350. Remote control receiver 350 in turn receives the coded command, decodes it, and communicates the required command signals to controlled device 400.

It being understood that a distinguishing feature of the invention is the number of commands that can be transmitted to a multiplicity of receivers without interference is virtually unlimited. This is predominately because the transmitter's existing internal logic precludes either simultaneous or conflicting keypad commands.

Figure 2:
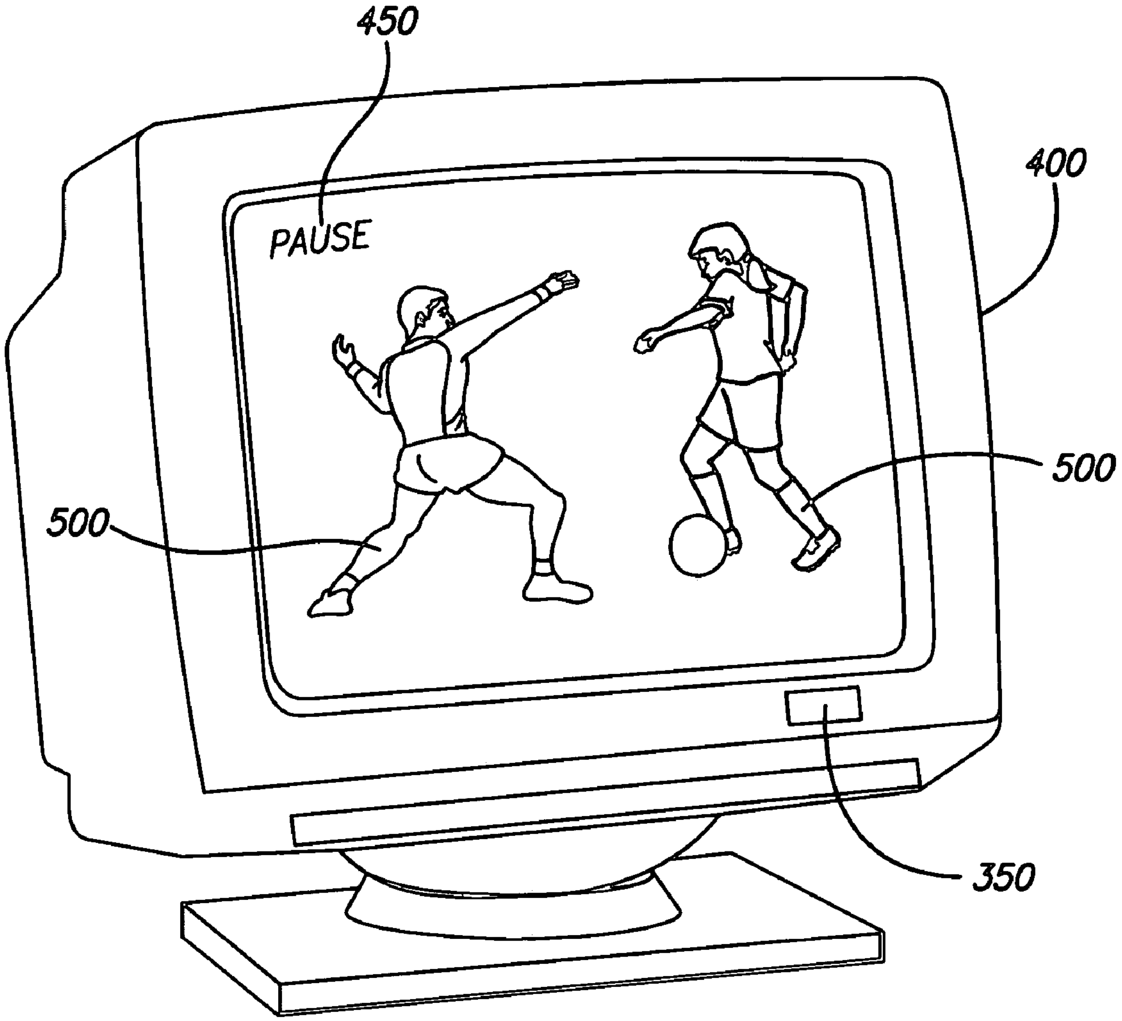
FIG. 2 is a pictorial showing, as an example, a television screen displaying a commanded function of a digital video recorder, such as a Tivo or Replay, in the background and video in the foreground.

FIG. 2. 450 is the commanded output of a Tivo or Replay digital video recorder, not shown, with its video output connected to a television receiver 400 displaying a foreground 500 scene while simultaneously displaying a commanded "Pause" 450 being received by a remote control receiver's input 350. It being understood that a feature of the invention is that a multiplicity of scenes 500 can be displayed simultaneously with a multiplicity of commanded functions 450 by using partitioned, multiplexed, or picture in picture electronics.

Figure 3:
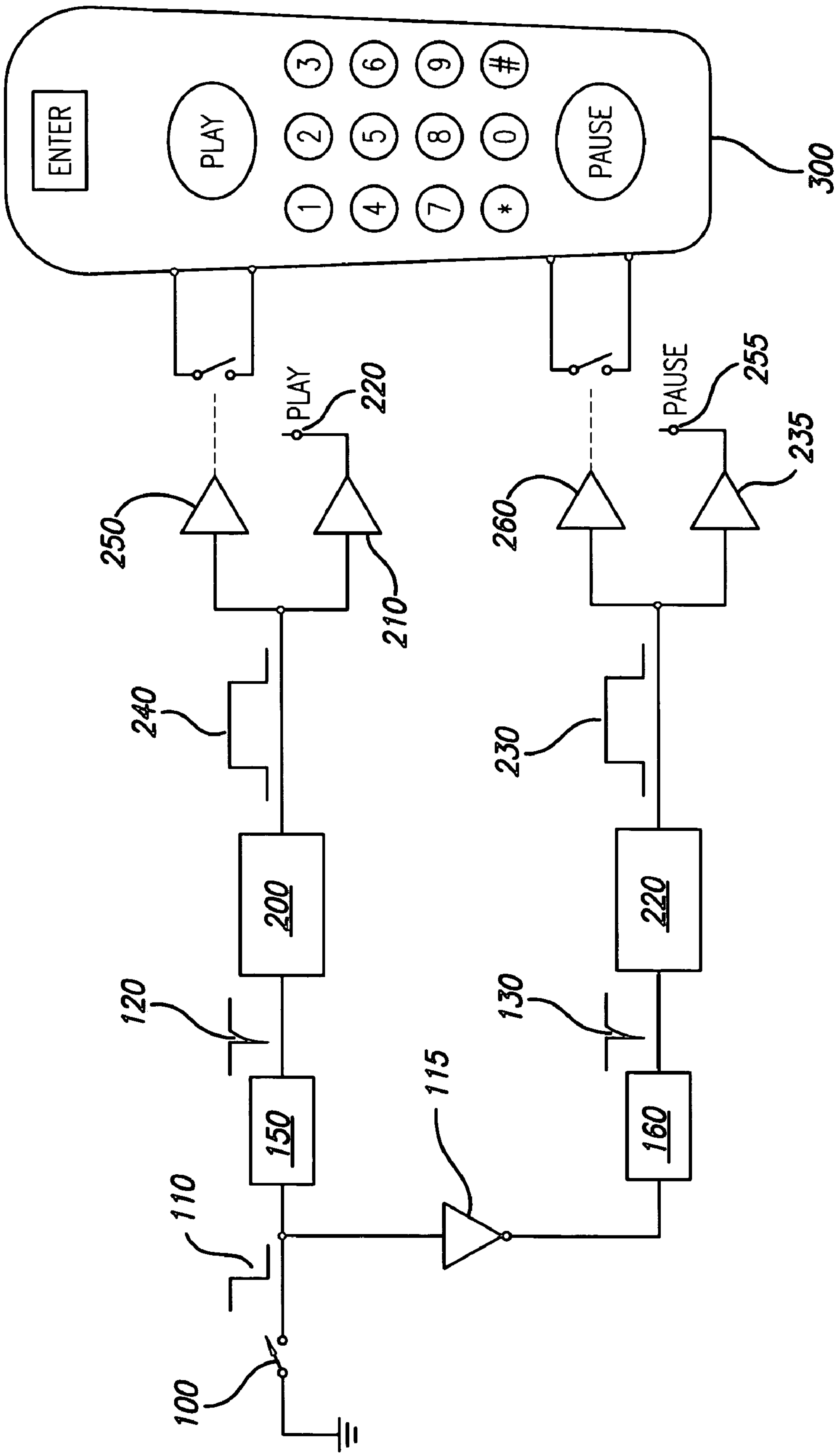
FIG. 3 is a functional block diagram for a specific application of the invention

FIG. 3 is a functional block diagram of an example application of the invention wherein a remote control transmitter 300 commands a digital video recorder FIG. 1 controlled device 400 to "Pause" operation when an observer viewing FIG. 2 400 leaves his sitting position and resumes "Play" operations when the observer resumes seating.

In the "Play" mode of operation FIG. 3 110 is the resultant steady state output signal level from switch 100 when activated by the observer sitting on a chair in which switch 100 is housed. Signal 110 is then coupled to interface conditioner 150 that converts signal 110 to signal 120 that is an exponentially decaying signal whose duration is substantially less than signal 240. This is to insure that the output of one-shot 200 signal 240 never remains high which would continually activate switching device 250 which in turn would continually command remote control transmitter 300 to "Play." Signal 240 is directly connected to switching device 250 which in turn commands remote control transmitter 300 to "Play" by closing 250 internal contacts. Signal 240 also commands "Play" indicator driver 210 which in turn commands "Play" indicator 220 to light when activated.

In the "Pause" mode of operation FIG. 3 110 the resultant steady state output signal level from switch 100 signal 110 is inverted from a positive to negative transition to a negative to positive transition. This signal is inverted by inverter 115 such that when the observer leaves the chair, in which switch 100 is housed, interface conditioner 160 produces signal 130 that is an exponentially decaying signal whose duration is substantially less than signal 230. This is again to insure that the output of one-shot logic 220 signal 230 never remains high which would continually activate switching device 260 which in turn would continually command remote control transmitter 300 to "Pause." Signal 230 is directly connected to switching device 260 which in turn commands remote control transmitter 300 to "Pause" by closing internal contacts of 260. Signal 230 also commands "Pause" indicator driver 235 which in turn commands "Pause" indicator 255 to light when activated.

The advantages of this claimed invention to Control Remote Control Transmitter functions via external inputs are described hereafter:

1: The Apparatus in FIG. 1 300 is a low cost commercially available off-the-shelf remote control transmitter that converts user selectable keypad entries into communication compatible signals, such as but not limited to the electromagnetic spectrum, infrared, visual, or acoustical that are received by an external communication capable remote control receiver 350 which in turn commands the controlled device of FIG. 1 400. Virtually all types, makes or models of remote control transmitters are capable of being modified without extensive engineering development and is independent of the communication medium used. Further, modifications to the remote control receiver are not required and modification of the existing remote control transmitter does not impair or compromise any other remote control transmitter, or function, that may be used with the invention.

2: The apparatus in FIG. 1 100 can be any sensor to detect virtually any parameter of interest, such as a proximity detector, switch, photocell etc., and can be interfaced with the system using existing low cost commercially available technology Further, the sensor can have imbedded independent intelligence with bi-directional signal capabilities that enable information to be transmitted back to other devices, such as security systems, without compromising any intended control function.

3: The apparatus in FIG. 1 150 is defined solely by sensor's output characteristics and may be a simple wired connection not requiring additional components or as complex as a dedicated microcontroller. In either case all components are commercially available.

4: The apparatus in FIG. 1 200 is comprised of commercially available electromechanical technology and can be a simple connection not requiring additional components or as complex as a dedicated microcontroller.

5: The apparatus in FIG. 1 250 can be any commercially available solid state or electromechanical device that provides a controlled impedance interface, such as a contact closure, to the remote control transmitter.

6: The apparatus in FIG. 1 350 can be any receiver with the capability and compatibility to receive communication medium signal 325 including but not limited to a hard wired transfer.

7: The apparatus of FIG. 1 400 can be any device used to display, control, manipulate or provide a man to machine interface. This in its simplest form can be a television receiver, robot or electromechanical manipulator.

While the invention has been described in its preferred embodiments, it is to be understood that the words which have been used are words of description rather than limitation and that changes may be made within the preview of the appended claims without departing from the true scope and spirit of the invention in its broader aspects.

For example, a commercially available television receiver need not be used or have a visual display but may have pattern recognition capabilities that would automatically manipulate an electromechanical device in an emergency situation.

What is claimed is:

1. A device, comprising:

a remote control transmitter, a remote control receiver, a remote controlled device operably linked to said remote control receiver in a room; and a switch; and one or more of a proximity detector, thermometer or a photocell operably linked to said switch;

said transmitter having one or more contacts, said one or more contacts operably linked to said receiver;

said switch operably linked to said transmitter.

2. The device of claim 1, further comprising a processor operably linked to said switch.

3. The device of claim 2, further comprising an interface conditioner operably linked to said processor.

4. The device of claim 1, wherein said proximity detector senses, or a position of a person in said room.

5. The device of claim 1, wherein said thermometer detects temperature in said room.

6. The device of claim 1, wherein said photocell detects ambient light in said room.

7. The device of claim 1, wherein said controlled device is a digital video recorder.

8. The device of claim 6, where activation of said sensor initiates a command to be sent from said remote transmitter to said remote receiver to initiate a change in said controlled device.

9. The device of claim 8, wherein said change in said controlled device is “Pause” or “Play.”

10. The device of claim 8, where said sensor is activated by a person standing up in said room, and where said change in said controlled device is “Pause.”

11. The device of claim 8, where said sensor is activated by a person sitting down in said room, and where said change in said controlled device is “Play.”

* * * * *